(12) United States Patent
Cha et al.

(10) Patent No.: US 9,613,457 B2
(45) Date of Patent: Apr. 4, 2017

(54) MULTI-PRIMITIVE FITTING DEVICE AND OPERATION METHOD THEREOF

(71) Applicant: Electronics and Telecommunications Research Institute, Daejeon (KR)

(72) Inventors: Young Mi Cha, Daejeon (KR); Chang Woo Chu, Daejeon (KR); Jae Hean Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 43 days.

(21) Appl. No.: 14/608,044

(22) Filed: Jan. 28, 2015

(65) Prior Publication Data

US 2015/0213644 A1 Jul. 30, 2015

(30) Foreign Application Priority Data

Jan. 28, 2014 (KR) ........................ 10-2014-0010562

(51) Int. Cl.
*G06T 17/10* (2006.01)
*G06T 17/20* (2006.01)

(52) U.S. Cl.
CPC .............. *G06T 17/10* (2013.01); *G06T 17/20* (2013.01); *G06T 2210/56* (2013.01)

(58) Field of Classification Search
None
See application file for complete search history.

(56) References Cited

U.S. PATENT DOCUMENTS

| | | | | | |
|---|---|---|---|---|---|
| 5,988,862 | A | * | 11/1999 | Kacyra | G01B 11/002 382/195 |
| 7,995,055 | B1 | * | 8/2011 | Ma | G06K 9/4604 345/420 |
| 2007/0253618 | A1 | * | 11/2007 | Kim | G06T 7/0018 382/154 |
| 2011/0304619 | A1 | * | 12/2011 | Fu | G06K 9/00201 345/420 |
| 2011/0304628 | A1 | * | 12/2011 | Fu | G06K 9/00201 345/441 |
| 2013/0207966 | A1 | | 8/2013 | Chu et al. | |
| 2014/0098094 | A1 | * | 4/2014 | Neumann | G06K 9/00214 345/420 |
| 2014/0192050 | A1 | * | 7/2014 | Qiu | G06K 9/00214 345/420 |

OTHER PUBLICATIONS

R. Schnabel et al., "Efficient RANSAC for Point-Cloud Shape Detection", Computer Graphics Forum, 2007, pp. 214-226, vol. 26, No. 2.

* cited by examiner

*Primary Examiner* — King Poon
*Assistant Examiner* — Vincent Peren

(57) ABSTRACT

Provided are a multi-primitive fitting method including an acquiring point cloud data by collecting data of each of input points, a obtaining a segment for the points using the point cloud data, and a performing primitive fitting using data of points included in the segment and the point cloud data, and a multi-primitive fitting device that performs the method.

13 Claims, 8 Drawing Sheets

THE SAMPLE NODES BELONGING
TO THE SAME SEGMENT
ARE INDICATED
BY THE SAME COLOR

MULTI-PRIMITIVE FITTING DEVICE AND OPERATION METHOD THEREOF

CROSS-REFERENCE TO RELATED APPLICATION

This application claims priority to and the benefit of Korean Patent Application No. 10-2014-0010562, filed on Jan. 28, 2014, the disclosure of which is incorporated herein by reference in its entirety.

BACKGROUND

1. Field of the Invention

The present invention relates to a multi-fitting technology for primitives of various shapes, and more particularly, to a multi-primitive fitting device using 3D point data, and an operation thereof.

2. Discussion of Related Art

Scanner equipment is utilized in various fields so as to rapidly acquire correct 3D data. Data acquired through the scanner equipment is called a three-dimensional point cloud, and various schemes of restoring a three-dimensional object using a large number of points easily and rapidly are being developed.

One of the schemes is a scheme of accurately fitting a primitive automatically when point data is given. In such a scheme, a primitive fitting operation is performed using all input points.

However, in such a conventional scheme, since all pieces of point data are used so as to obtain one primitive, an amount of calculation increases and real time characteristics cannot be secured. That is, it is necessary to process a large amount of point data used at the time of primitive fitting so as to reduce an amount of calculation and secure real time characteristics.

SUMMARY OF THE INVENTION

An object of the present invention is to provide a technical scheme of fitting a point cloud to primitives of multi-shape in real time.

According to an aspect of the present invention, a multi-primitive fitting method includes an acquiring point cloud data by collecting data of each of input points; obtaining a segment for the points using the point cloud data; and performing primitive fitting using data of points included in the segment.

Here, the acquiring includes collecting point data from each point input from the outside to acquire the point cloud data, and includes collecting a normal value of each point or a value obtained by performing a normal estimation operation as the point data.

Further, the obtaining includes setting a neighborhood relationship with adjacent points at each of the points; generating sample nodes; generating an edge and setting an edge weight; and obtaining connected sample nodes as one segment in consideration of the edge weight.

In this case, the generating of the sample nodes includes using a plurality of randomly extracted sample points among the points as nodes of a graph to generate sample nodes, the generating of the edge and the setting of the edge weight includes generating a connection relationship between the sample node and a neighboring sample node as an edge, and includes setting a relatively high weight of an edge having high density of the sample nodes or a short distance between the sample nodes; and setting the weight of the edge to 0 when the distance between the sample nodes is equal to or greater than a previously set threshold, and the setting of the neighborhood relationship includes setting the neighborhood relationship using a K-Nearest Neighbor (KNN) scheme.

In addition, the performing includes: using points belonging to the segment as an input to fit a non-plane primitive; checking first validity of the fitted non-plane primitive; using points other than the points belonging to the non-plane primitive as an input to fit the plane primitive when the first validity check passes; checking second validity of the fitted plane primitive; confirming whether the number of points other than the points belonging to the plane primitive is equal to or greater than a previously set threshold value when the second validity check passes; returns to using of the points other than the points belonging to the plane primitive as an input to fit the non-plane primitive when the number is equal to or greater than the threshold value; and ending the primitive fitting when the number of points is smaller than the threshold value.

Meanwhile, according to another aspect of the present invention, a multi-primitive fitting device includes an acquisition unit that collects data of each of input points to acquire point cloud data; a segmentation unit that obtains a segment for the points using the point cloud data; and a primitive fitting unit that performs primitive fitting using data of points included in the segment.

Here, the acquisition unit collects a normal value of each of points input from the outside or a value obtained by performing a normal estimation operation as the point data to acquire the point cloud data.

Further, the segmentation unit sets a neighborhood relationship with adjacent points at each of the points using a KNN scheme, using a plurality of randomly extracted sample points among the points as nodes of a graph to generate sample nodes, generates a connection relationship between the sample node and a neighboring sample node as an edge, sets an edge weight, and obtains connected sample nodes as one segment in consideration of the edge weight.

Further, the segmentation unit sets a relatively high weight of an edge having high density or a short distance between the sample nodes, and sets the weight of the edge to 0 when the distance between the sample nodes is equal to or greater than a previously set threshold.

In addition, the primitive fitting unit uses points belonging to the segment as an input to perform primitive fitting, checks validity of the fitted primitive, confirms the number of points other than the points belonging to the fitted primitive when the validity check passes, and using points other than the points belonging to the primitive as an input to perform primitive fitting again when it is determined that the number of points is equal to or greater than a threshold value.

According to the embodiment of the present invention, a large number of segments are obtained to perform the primitive fitting without all data of any points input from the outside at the time of primitive fitting. Accordingly, an amount of calculation is smaller than that in a conventional primitive fitting operation and the primitive fitting result can be derived in real time.

Further, it is possible to perform multi-fitting in real time by performing primitive fitting on each segment without separate user input and selection.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
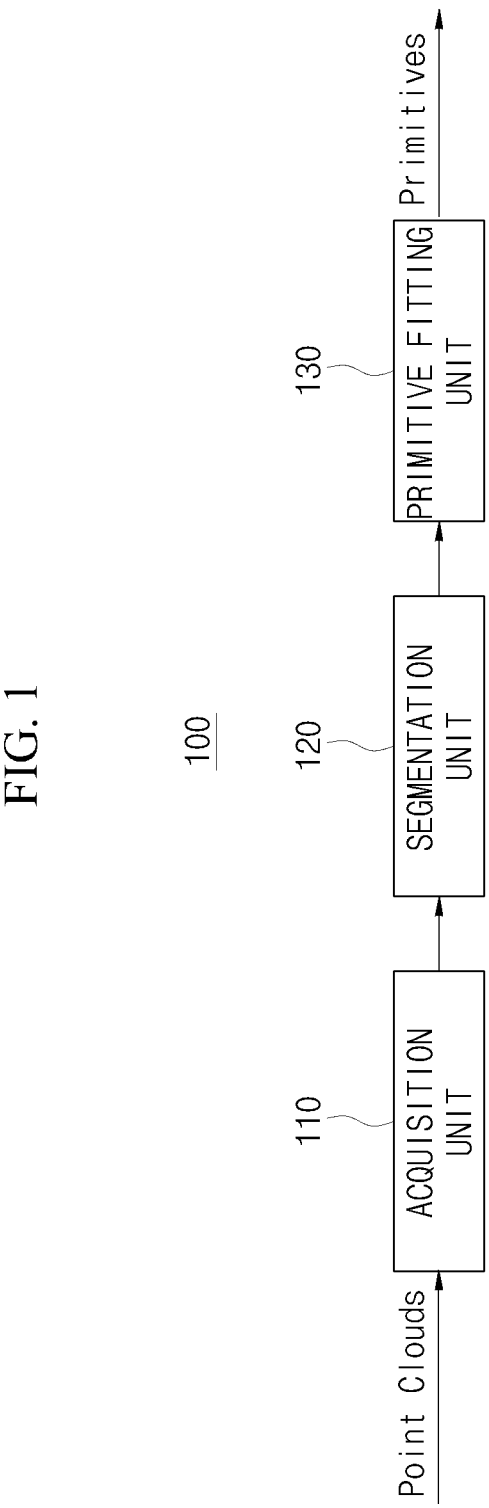
FIG. 1 is a block diagram of a multi-primitive device according to an embodiment of the present invention.

Embodiments of the present invention are disclosed herein. However, specific structural and functional details disclosed herein are merely representative for purposes of describing embodiments of the present invention, however, embodiments of the present invention may be embodied in many alternate forms and should not be construed as limited to embodiments of the present invention set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures. The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, preferred embodiments of the present invention will be described in detail with reference to the accompanying drawings. First, in denoting components of the drawings with reference signs, the same components are denoted with the same reference signs even when the same components are shown on different drawings. In describing the present invention, when a concrete description of related known configurations or functions may make the gist of the present invention ambiguous, detailed explanation thereof will be omitted.

Figure 2:
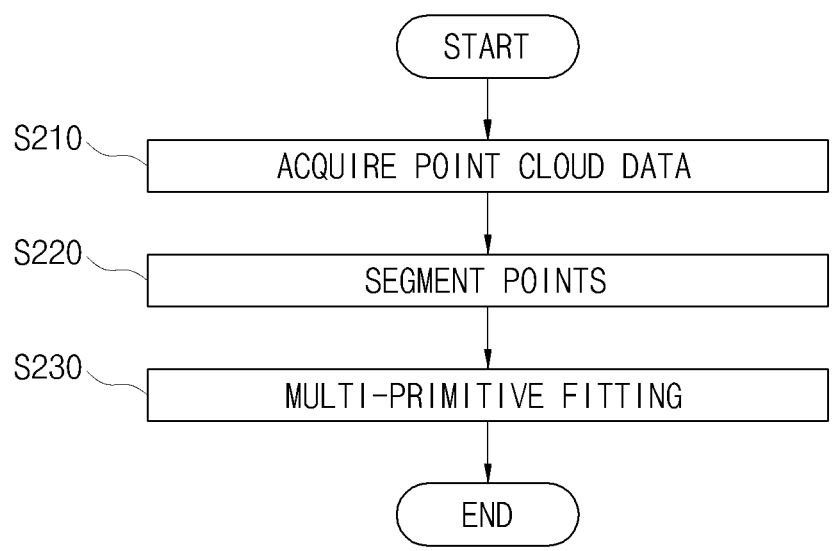
FIG. 2 is a flowchart illustrating a multi-primitive method in a multi-primitive device according to an embodiment of the present invention.

FIG. 1 is a block diagram of a multi-primitive device according to an embodiment of the present invention, and FIG. 2 is a flowchart illustrating a multi-primitive method according to an embodiment of the present invention.

The multi-primitive device 100 includes an acquisition unit 110, a segmentation unit 120, and a primitive fitting unit 130, as illustrated in FIG. 1. Hereinafter, an operation of the respective components of the multi-primitive device 100 will be described in detail with reference to FIGS. 2 to 7.

In step S210, the acquisition unit 110 of the multi-primitive device 100 acquires point cloud data. The acquisition unit 110 receives arbitrary points of an object that is a modeling target from an external apparatus such as 3D scanner equipment, and acquires point data for each input point. In this case, the input points may be referred to as a three-dimensional point cloud.

Further, the acquired point data includes a position coordinate value and a normal value of each point. Here, when the normal value represents an object in a 3D-graphic manner, it is necessary to recognize a direction of a surface of the object, and the normal value refers to a normal vector in which a direction is set based on a three-dimensional axis to recognize the direction of the object surface.

When the normal value of the point is not given, the acquisition unit 110 performs a normal estimation operation and acquires a value obtained through the normal estimation operation as the normal value. The normal values of the points acquired through such a process are designated as point data and stored in a memory.

In step S220, the segmentation unit 120 of the multi-primitive device 100 segments the input points.

For example, the segmentation unit 120 segments the point data acquired from the acquisition unit 110 using a data segmentation scheme. Here, the segmentation refers to dividing the point data in units of minimum sets (segments) having the form of various figures in the field of a computer graphic processing technology.

Figure 3:
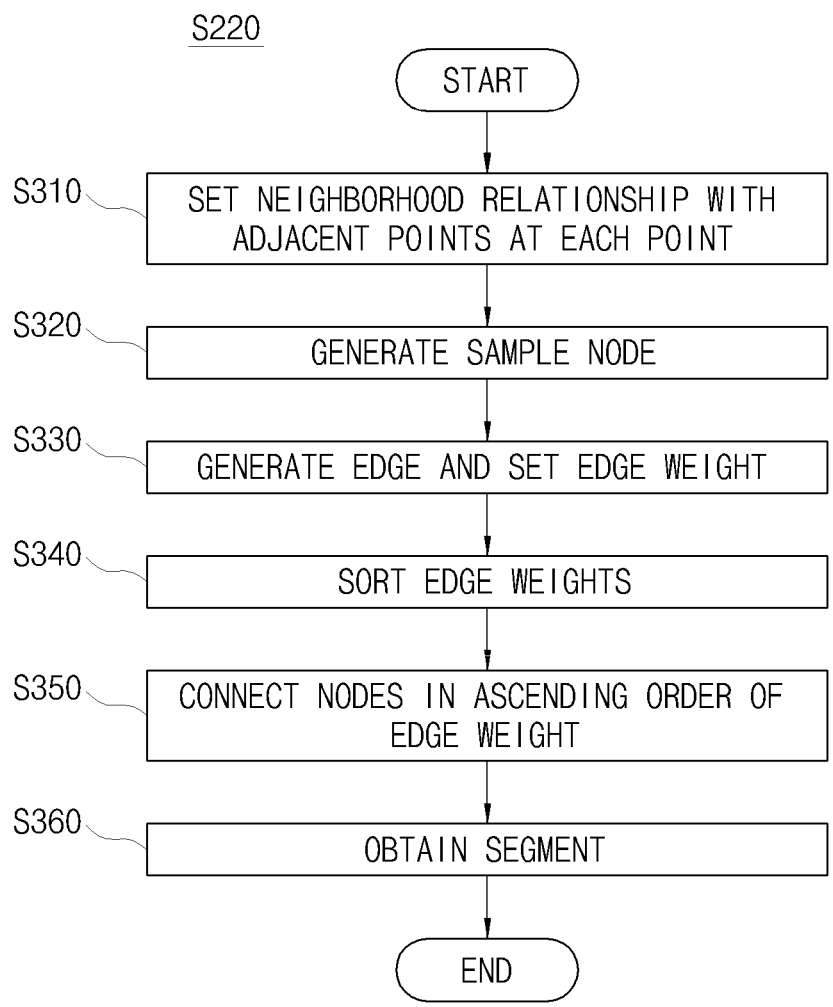
FIG. 3 is a flowchart illustrating a segmentation method in a multi-primitive device according to the present invention.

Hereinafter, a process in which the segmentation unit 120 performs graph-based segmentation using a data segmentation scheme (step S220) will be described with reference to FIG. 3.

In step S310, when point data is acquired, the segmentation unit 120 sets a neighborhood relationship with adjacent points at each point. In this case, the segmentation unit 120 may set the neighborhood relationship using a K-Nearest Neighbor (KNN) scheme.

In step S320, the segmentation unit 120 generates a sample node constituting a graph. Here, the sample node may include only one point or may include a set of points of which the neighborhood relationship has been set in step S310.

Figure 4:
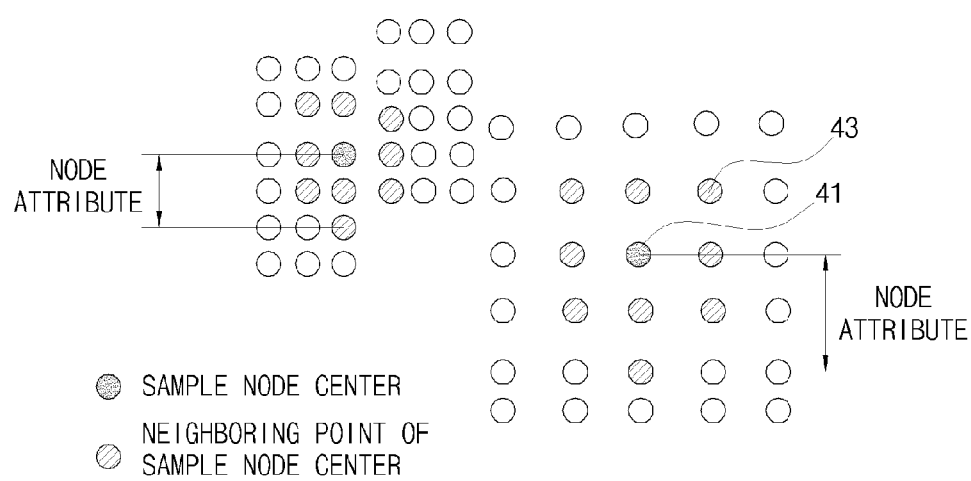
FIG. 4 is a first illustrative diagram illustrating a segmentation method in a multi-primitive device according to the present invention.

For example, when the sample node includes the set of the points of which the neighborhood relationship has been set in step S310, the segmentation unit 120 selects any one of the points as a center 41 of the sample node, as illustrated in FIG. 4.

In this case, the sample node has a unique attribute value. A distance between a farthest neighboring point among the points 43 of which the neighborhood relationship is set with a point selected as a center of the sample node and the sample point (the center 41 of the sample) may be used as the attribute value.

Figure 5:
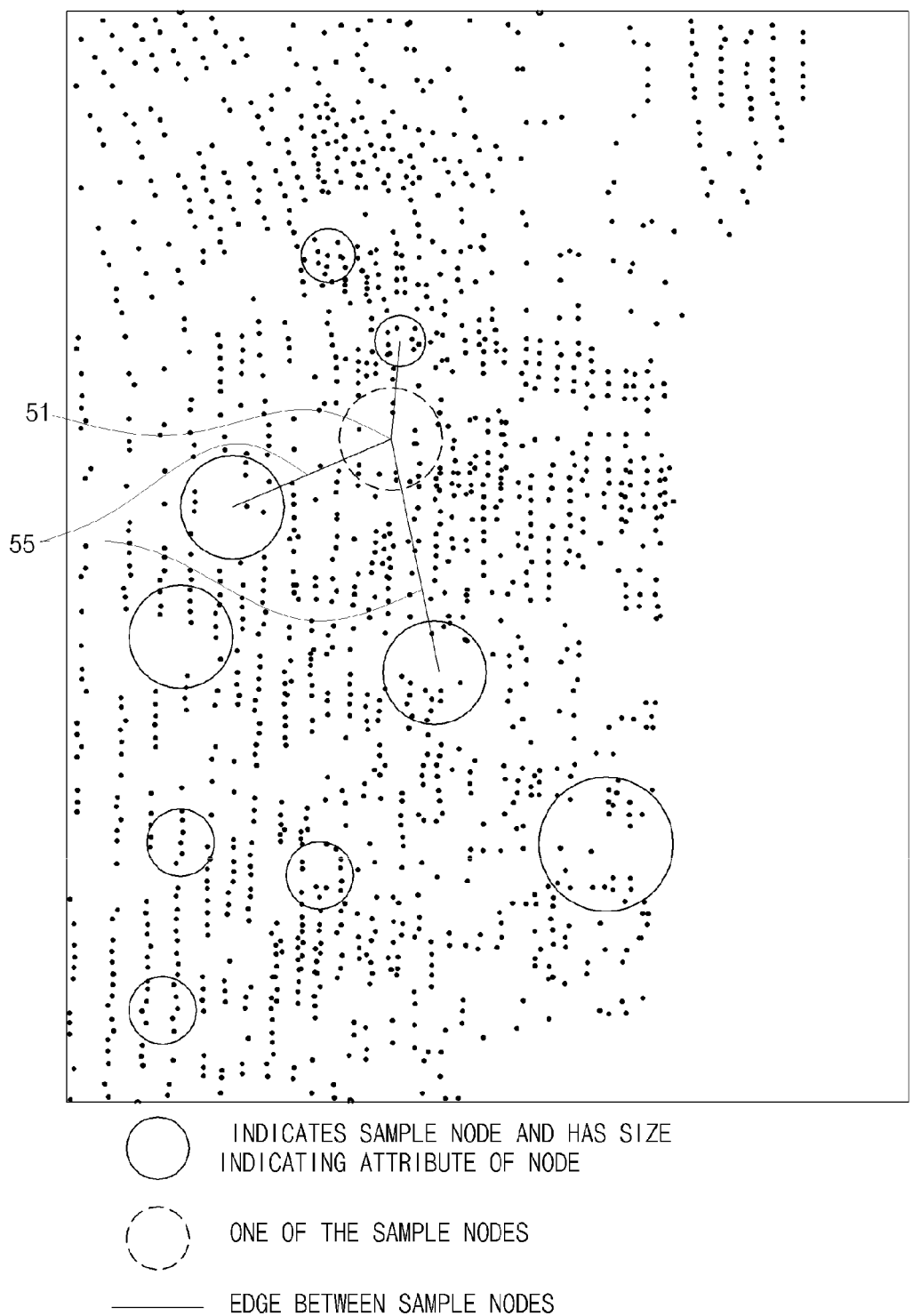
FIG. 5 is a second illustrative diagram illustrating a segmentation method in a multi-primitive device according to the present invention.

Here, the attribute value of the sample node, that is, the distance means a density of the sample node. As the attribute value of the sample node is greater, the density is lower, and as the attribute value is smaller, the density is higher. For example, as a size of a circle of which the center is the sample point 41 and a distance (attribute value of the sample node) between the sample point 41 and a farthest neighbor point is a radius as illustrated in FIG. 5 is greater, the density is lower, and as the size of circle is smaller, the density is higher.

The segmentation unit 120 sorts the sample nodes generated in this way in low ascending order of the attribute value. The segmentation unit 120 first looks for neighboring sample nodes of the sample node having highest density. In this case, a KNN scheme may be used. Then, the segmentation unit 120 looks for neighboring sample nodes of the sample node in ascending order of the density.

In step S330, the segmentation unit 120 generates an edge indicating a connection relationship between the sample node and the neighboring sample nodes, and sets an edge weight of the edge. For example, the segmentation unit 120 generates a connection relationship between a center 51 of any one sample node and a center of each of the neighboring sample nodes as the edge (a straight line of FIG. 5) 55, as illustrated in FIG. 5, and sets the weight of the edge. Then, the edge weight can be variously set.

For example, the segmentation unit 120 can set a high weight for an edge having high density and connected to the neighboring sample node having a short distance from the sample node. Further, when the distance between the sample node and the neighboring sample is equal to or greater than a threshold set in advance by a user, the segmentation unit 120 can set the edge weight to 0.

In step S340, after setting the edge weight, the segmentation unit 120 sorts the edge weights. For example, the segmentation unit 120 can sort the edge weights in descending order.

In step S350, after aligning the edge weight, the segmentation unit 120 connects the sample nodes in ascending order of the edge weight.

In step S360, the segmentation unit 120 obtains the segment through such a process and completes the point segmentation process. For example, the segmentation unit 120 can obtain the sample nodes connected in S350 as one segment.

Figure 6:
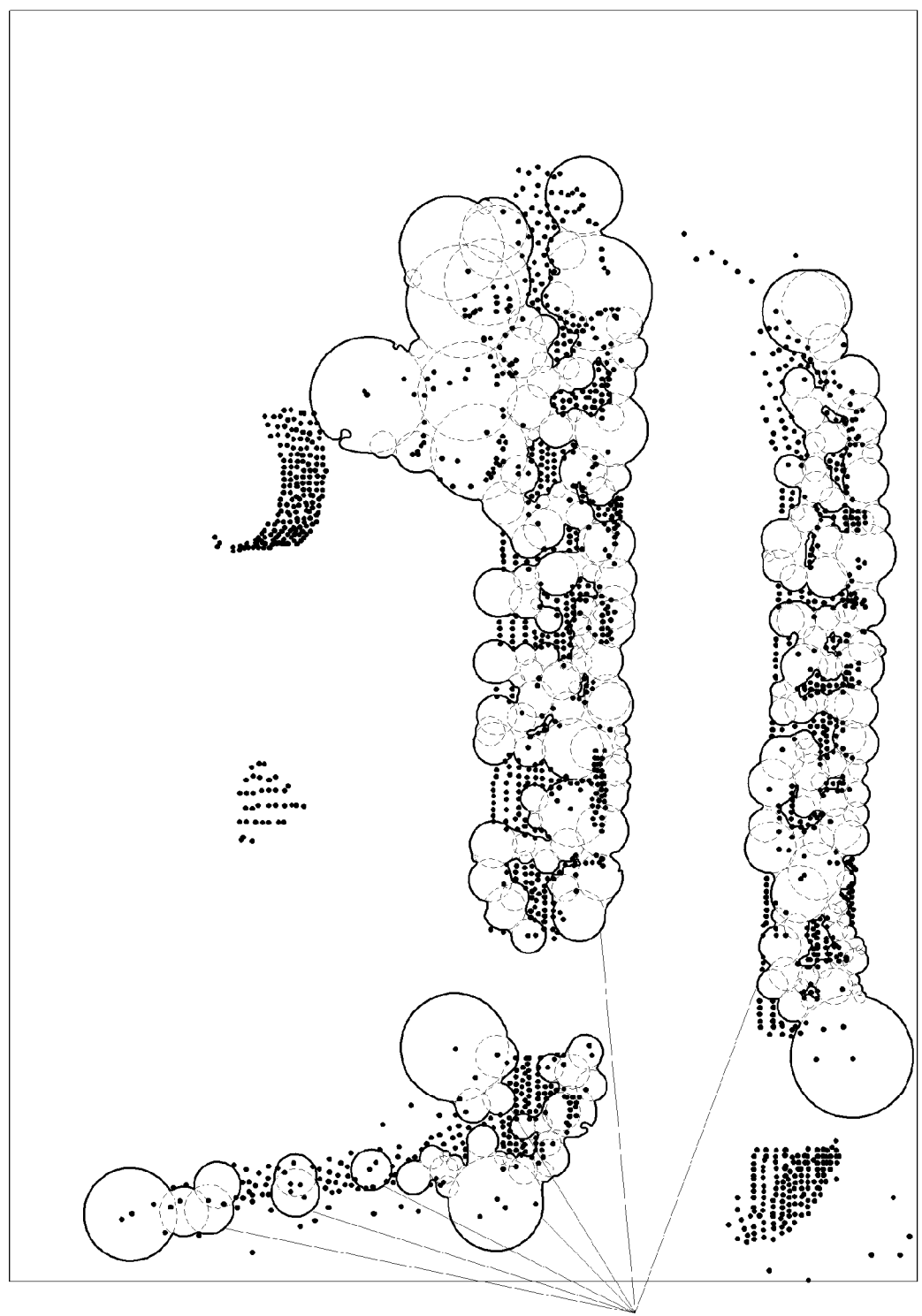
FIG. 6 is a third illustrative diagram illustrating a segmentation method in a multi-primitive device according to the present invention.

Meanwhile, when the sample nodes belonging to the same segment are indicated by the same color as a result of the graph-based segmentation, the sample nodes can be represented as shown in FIG. 6.

In step S230, referring back to FIG. 2, when the above-described segmentation process (S220) is completed, the primitive fitting unit 130 of the multi-primitive device 100 performs a multi-primitive fitting operation.

For example, the primitive fitting unit 130 executes the primitive fitting algorithm using a segmentation result of the segmentation unit 120. In this case, the primitive fitting unit 130 performs a primitive fitting procedure on each segment.

The following primitive fitting process of the primitive fitting unit 130 will be described in connection with any one segment among a large number of segments obtained in the segmentation unit 120, and the same can apply to the other segments.

The primitive fitting unit 130 uses the points belonging to the segment obtained by the segmentation unit 120 as an input to perform primitive fitting and check validity. When the validity check passes, the primitive fitting unit 130 confirms the number of points other than the points belonging to the fitted primitive.

When the number of points other than the points belonging to the primitive is equal to or greater than a previously set threshold value, the primitive fitting unit 130 uses the points other than the points belonging to the primitive as an input to perform primitive fitting again. Primitive fitting algorithms for primitive fitting may be classified into non-plane primitive fitting and plane primitive fitting.

The non-plane primitive fitting algorithm fits a cylinder, a sphere, a corn, or the like, and the plane primitive fitting algorithm fits a plane. Such a primitive algorithm is an algorithm stored by an operator or a user in advance.

Figure 7:
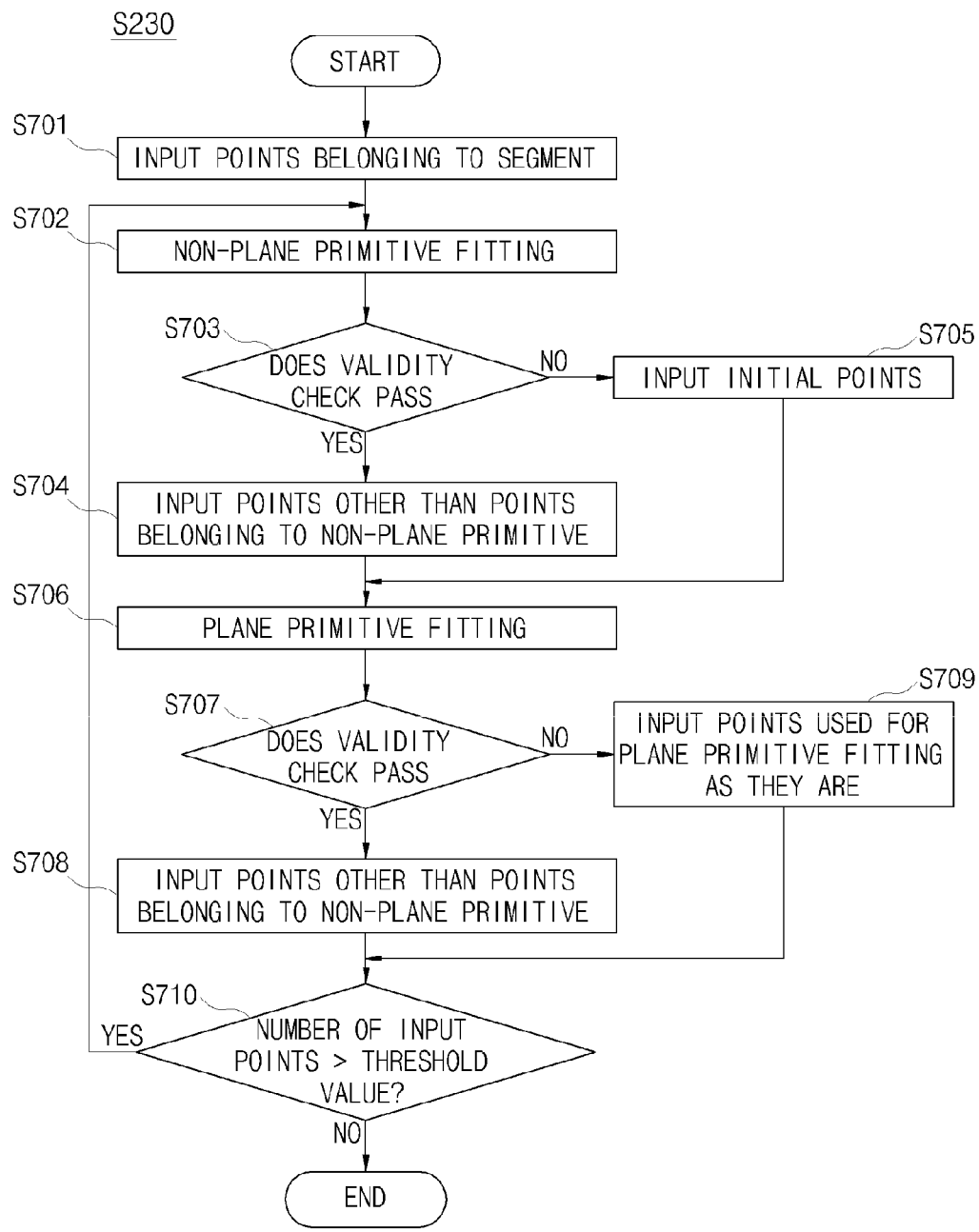
FIG. 7 is a flowchart illustrating a primitive fitting method in a multi-primitive device according to the present invention.

Hereinafter, a process in which the primitive fitting unit 130 performs multi-primitive fitting using a result of the segmentation (a result of step S220) of the segmentation unit 120 (step S230) will be described in detail with reference to a flowchart of FIG. 7.

In step S701 and in step S702, the primitive fitting unit 130 uses points belonging to the segment as an input to perform non-plane primitive fitting. For example, the primitive fitting unit 130 performs the non-plane primitive fitting on the points belonging to the segment using the non-plane primitive fitting algorithm.

In step S703, after the non-plane primitive fitting, the primitive fitting unit 130 checks the validity. For example, the primitive fitting unit 130 confirms whether the primitive fitted in step (S702) is not a plane to check the validity (first validity). That is, the primitive fitting unit 130 confirms whether the non-plane primitive is correctly obtained through the fitting operation of step S702. When the first check passes in the check in step S703, this means that the non-plane primitive has been correctly obtained.

In step S704, when the non-plane primitive is correctly obtained, the primitive fitting unit 130 uses points other than the points belonging to the primitive (non-plane primitive) fitted in step S702 as an input of the next step (plane primitive fitting step).

In step S705, When the first check does not pass in step S703, that is, when the non-plane primitive is not correctly obtained, the primitive fitting unit 130 uses the points input in step S701 as an input of the next step as they are (plane primitive fitting).

In step S706, that is, in the plane primitive fitting process, when the first validity check in step S702 passes, the primitive fitting unit 130 performs the plane primitive fitting algorithm using the points other than the points belonging to the primitive fitted in step S702, and when the first validity check does not pass, the primitive fitting unit 130 performs the plane primitive fitting algorithm using the points input in step S701.

In step S707, after the plane primitive fitting, the primitive fitting unit 130 performs validity (second validity) check. In this case, the second validity check is intended to confirm that the primitive fitted in step S706 is a plane.

When it is checked in step S707 that the second validity check passes, this means that the plane primitive is correctly obtained. In step S708, when the plane primitive is correctly obtained, the primitive fitting unit 130 uses points other than the points belonging to the primitive fitted in S706 (plane primitive) as an input values again.

In step S709, when the second validity check does not pass in step S707, that is, when the plane primitive is correctly obtained, the primitive fitting unit 130 uses the points input for plane primitive fitting in step S706 as an input values of the next step as they are.

In step S710, in this case, the primitive fitting unit 130 confirms the number of input values before performing the primitive fitting algorithm again. In this case, the primitive fitting unit 130 confirms whether the number of input points in step S708 or S709 is smaller than a previously set threshold value.

When it is confirmed in step S710 that the number of input points in step S708 or step S709 is smaller than the threshold value, the primitive fitting unit 130 ends the primitive algorithm.

When it is confirmed in step S710 that the number of input points (step S708 or S709) is equal to or greater than the threshold value, the primitive fitting unit 130 returns to the non-plane primitive fitting process (step S702) to perform all processes of the primitive fitting again.

Thus, according to the present invention, a large number of segments are obtained to perform the primitive fitting without all data of any points input from the outside at the time of primitive fitting. Accordingly, an amount of calculation is smaller than that in a conventional primitive fitting operation and the primitive fitting result can be derived in real time. Further, it is possible to perform multi-fitting in real time by performing primitive fitting on each segment without separate user input and selection.

Figure 8:
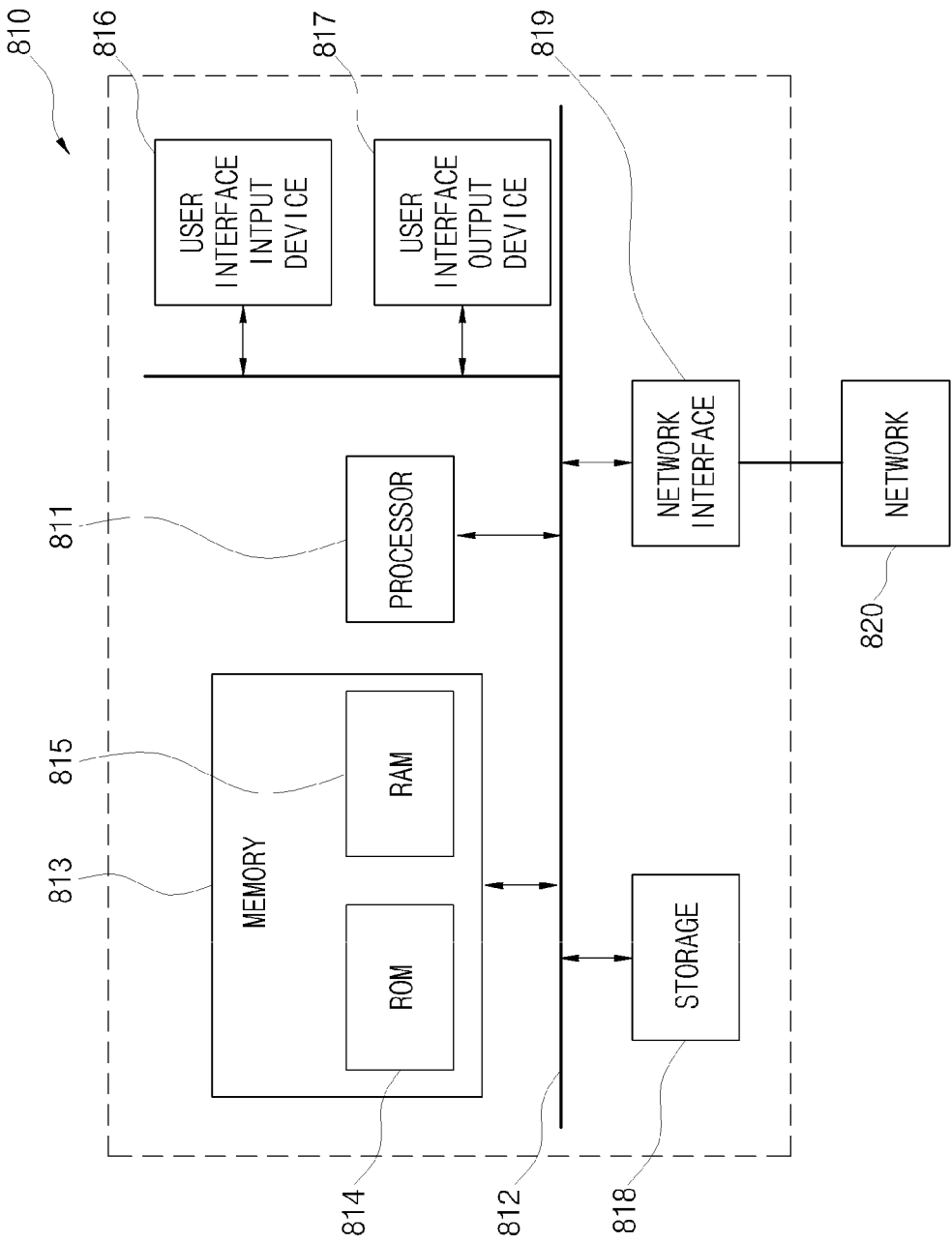
FIG. 8 is a block diagram illustrating a computer system for the present invention.

An embodiment of the present invention may be implemented in a computer system, e.g., as a computer readable medium. As shown in FIG. 8, a computer system 810 may include one or more of a processor 811, a memory 813, a user input device 816, a user output device 817, and a storage 818, each of which communicates through a bus 812. The computer system 810 may also include a network interface 819 that is coupled to a network 820. The processor 811 may be a central processing unit (CPU) or a semiconductor device that executes processing instructions stored in the memory 813 and/or the storage 818. The memory 813 and the storage 818 may include various forms of volatile or non-volatile storage media. For example, the memory may include a read-only memory (ROM) 814 and a random access memory (RAM) 815.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

The present invention has been described above in connection with the preferred embodiments. It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

DESCRIPTION OF REFERENCE SIGNS

100: multi-primitive fitting device
110: acquisition unit
120: segmentation unit
130: primitive fitting unit

What is claimed is:

1. A multi-primitive fitting method comprising:
   acquiring point cloud data by collecting data of each of input points;
   obtaining a segment for the points using the point cloud data; and
   performing primitive fitting using data of points included in the segment by:
   performing a first primitive fitting using points belonging to the segment to produce a fitted primitive,
   performing a validity check to check a validity of the fitted primitive,
   determining a number of points belonging to the segment and not belonging to the fitted primitive when the validity check passes, and
   performing a second primitive fitting using only points belonging to the segment and not belonging to the fitted primitive when the number of points belonging to the segment and not belonging to the fitted primitive is equal to or greater than a threshold value.

2. The multi-primitive fitting method according to claim 1,
   wherein the acquiring includes collecting a normal value of each point or a value obtained by performing a normal estimation operation to acquire the point cloud data.

3. The multi-primitive fitting method according to claim 1,
   wherein the obtaining includes:
   setting a neighborhood relationship with adjacent points at each of the points;
   randomly extracting sample points among the points to generate a plurality of sample nodes around each of the sample points;
   generating a connection relationship between one of the sample nodes and another sample node as an edge, and setting an edge weight for the edge; and
   acquiring connected sample nodes as one segment in consideration of the edge weight.

4. The multi-primitive fitting method according to claim 3,
   wherein the setting of the edge weight for the edge includes:
   setting a weight of the edge according to a density of the sample nodes or a distance between centers of the sample nodes; and
   setting the weight of the edge to 0 when the distance between the centers of the sample nodes is equal to or greater than a previously set threshold.

5. The multi-primitive fitting method according to claim 3,
   wherein the setting of the neighborhood relationship includes setting the neighborhood relationship using a K-Nearest Neighbor (KNN) scheme.

6. The multi-primitive fitting method according to claim 1, further comprising:
   ending performing primitive fitting when it is confirmed that the number of points belonging to the segment and not belonging to the plane primitive is smaller than the threshold value.

7. A multi-primitive fitting device comprising:
   an acquisition unit that collects data of each of input points to acquire point cloud data;
   a segmentation unit that obtains a segment for the points using the point cloud data; and
   a primitive fitting unit that performs primitive fitting using data of points included in the segment, wherein the primitive fitting unit:
   performs a first primitive fitting using points belonging to the segment to produce a fitted primitive,
   performs a validity check to check a validity of the fitted primitive,
   determines a number of points belonging to the segment and not belonging to the fitted primitive when the validity check passes, and
   performs a second primitive fitting using only points belonging to the segment and not belonging to the fitted primitive when the number of points belonging to the segment and not belonging to the fitted primitive is equal to or greater than a threshold value.

8. The multi-primitive fitting device according to claim 7, wherein the acquisition unit collects a normal value of each point or a value obtained by performing a normal estimation operation as data of each of the points.

9. The multi-primitive fitting device according to claim 7, wherein the segmentation unit sets a neighborhood relationship with adjacent points at each of the points using a K-Nearest Neighbor (KNN) scheme, randomly extracts sample points among the points, generates a plurality of sample nodes around each of the sample points, generates a connection relationship between one of the sample nodes and another sample node as an edge, sets an edge weight for the edge, and acquires connected sample nodes as one segment in consideration of the edge weight.

10. The multi-primitive fitting device according to claim 9, wherein the segmentation unit sets a weight of the edge according to a density of the sample nodes or a distance between centers of the sample nodes.

11. The multi-primitive fitting device according to claim 9, wherein the segmentation unit sets the weight of the edge to 0 when the distance between the centers of the sample nodes is equal to or greater than a previously set threshold.

12. A multi-primitive fitting device comprising:
an acquisition unit that collects data of each of input points to acquire point cloud data;
a segmentation unit that obtains a segment for the points using the point cloud data; and
a primitive fitting unit that performs primitive fitting using data of points included in the segment, wherein the primitive fitting unit:
  generates a fitted non-plane primitive using points belonging to the segment to fit a non-plane primitive,
  performs a first validity check to check a first validity of the fitted non-plane primitive,
  generates a fitted plane primitive using only points belonging to the segment and not belonging to the non-plane primitive to fit a plane primitive when the first validity check passes,
  performs a second validity check to check a second validity of the fitted plane primitive,
  determines whether a number of points belonging to the segment and not belonging to the fitted plane primitive is equal to or greater than a previously set threshold value when the second validity check passes, and
  ends the primitive fitting operation when the number of points belonging to the segment and not belonging to the plane primitive is smaller than the threshold value.

13. The multi-primitive fitting device according to claim 12, wherein the primitive fitting unit uses only the points belonging to the segment and not belonging to the plane primitive to fit the non-plane primitive again when the number of points belonging to the segment and not belonging to the plane primitive is equal to or greater than the threshold value.

* * * * *